Figure 7:
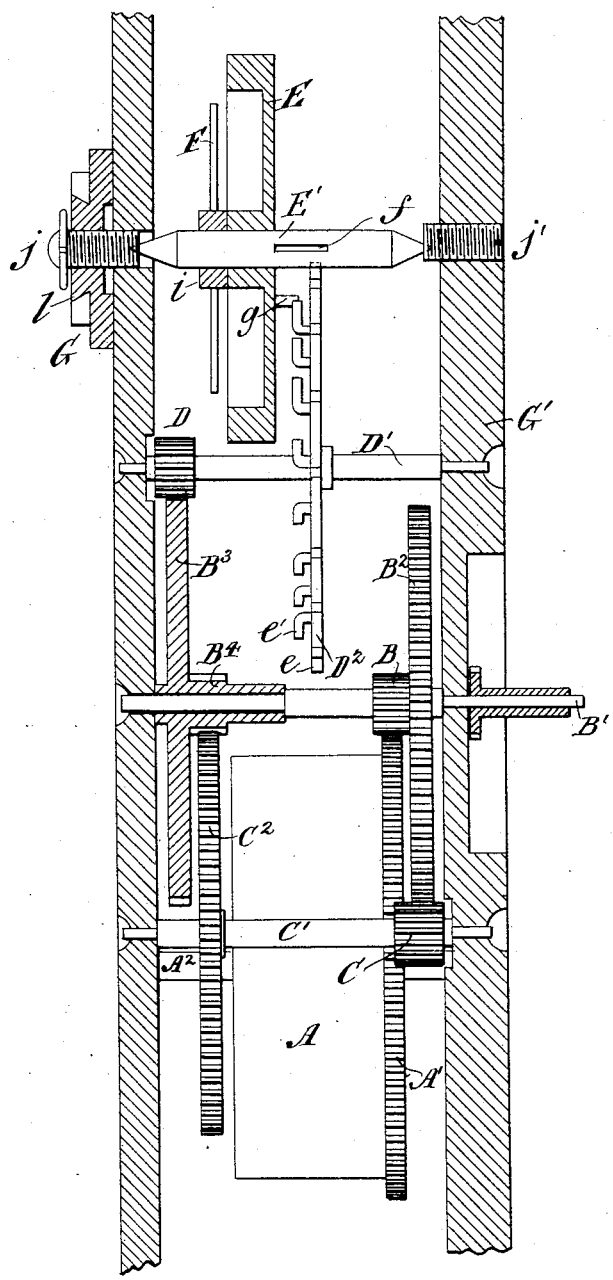

(No Model.) 4 Sheets—Sheet 1.
H. W. HAYDEN.
WATCH.
No. 312,848. Patented Feb. 24, 1885.
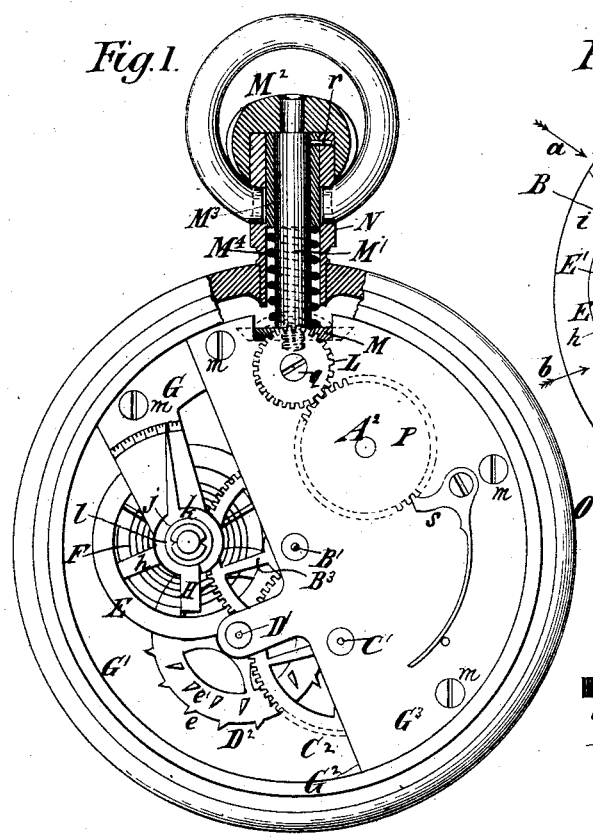
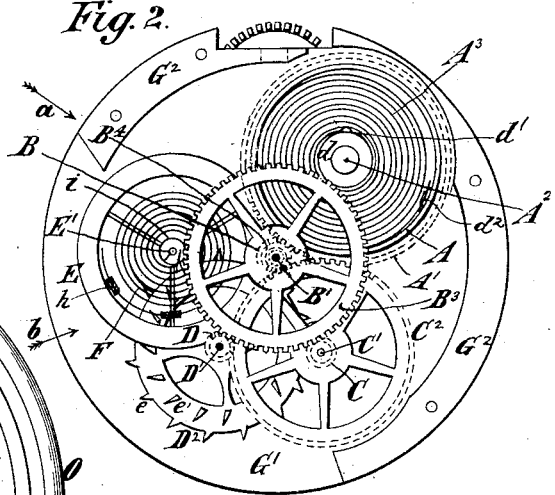
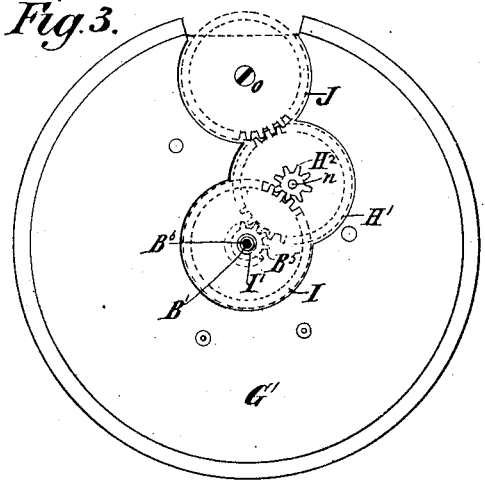
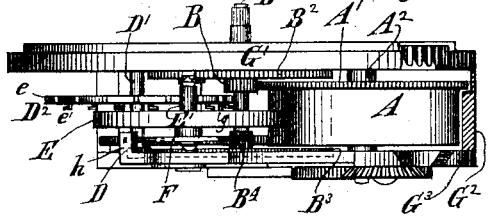
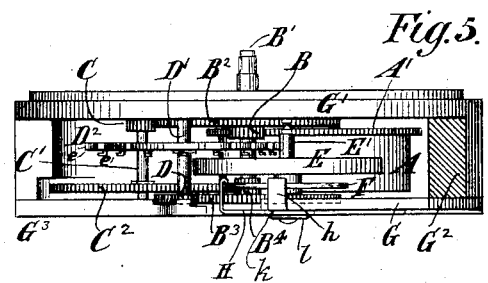
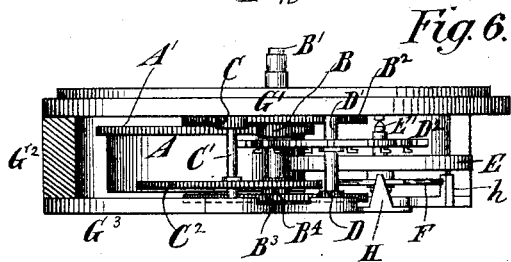
Witnesses
James R. Bowen
T. J. Keane
Inventor
Hiram W. Hayden (No Model.) 4 Sheets—Sheet 2.
H. W. HAYDEN.
WATCH.
No. 312,848. Patented Feb. 24, 1885.
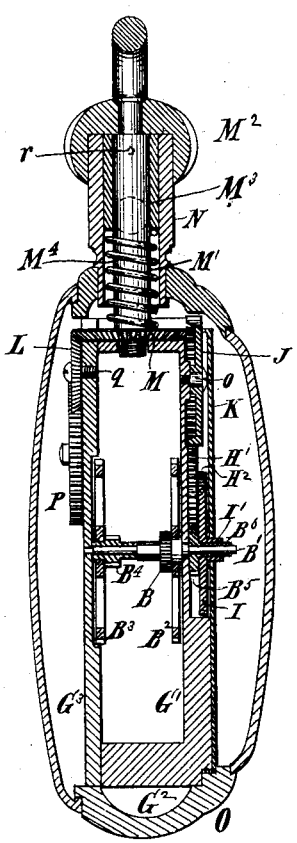
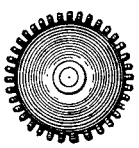
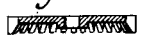
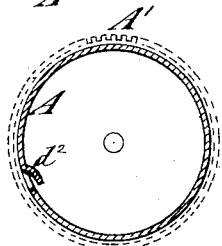
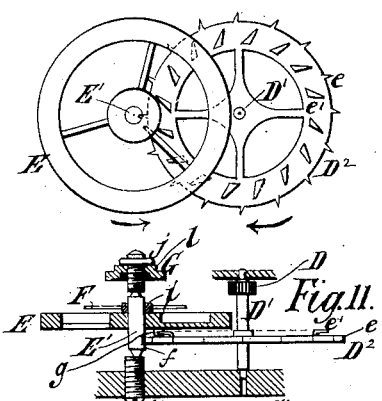
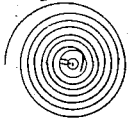
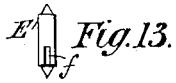
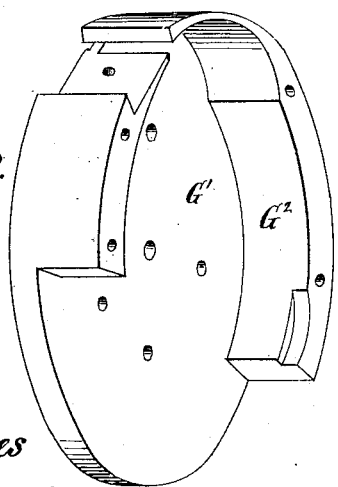
Witnesses
James R. Bowen
T. J. Keane
Inventor
Hiram W. Hayden
N. PETERS, Photo-Lithographer, Washington, D. C.

(No Model.) 4 Sheets—Sheet 3.

H. W. HAYDEN.
WATCH.

No. 312,848. Patented Feb. 24, 1885.

Witnesses
James R. Bowen.
Abner D. Griswold

Inventor
Hiram W. Hayden,
by his attorneys
Gifford & Brown

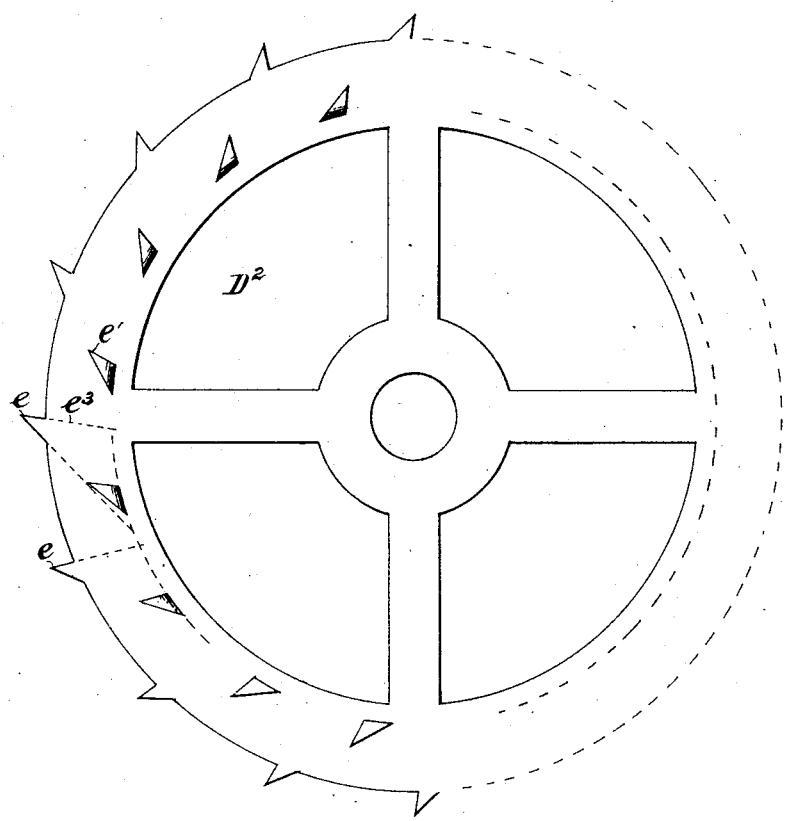

UNITED STATES PATENT OFFICE.

HIRAM W. HAYDEN, OF WATERBURY, CONNECTICUT.

WATCH.

SPECIFICATION forming part of Letters Patent No. 312,848, dated February 24, 1885.

Application filed February 6, 1884. (No model.)

*To all whom it may concern:*

Be it known that I, HIRAM W. HAYDEN, of Waterbury, in the county of New Haven and State of Connecticut, have invented a certain new and useful Improvement in Time-Pieces, of which the following is a specification.

I will explain in detail a watch embodying my improvement and then point out the various features of the improvement in claims. In the accompanying drawings, Figure 1 is a rear view of a watch embodying my improvement, the back of the case being removed and the stem being shown in section. Fig. 2 is a rear view of the movement, with the back plate of the movement-frame removed. Fig. 3 is a face view of the front plate, with the dial and a plate bearing the dial removed. Fig. 4 is an edge view of the movement, with part of the frame removed, looking in the direction indicated by the arrow $a$, Fig. 1. Fig. 5 is an edge view of the movement, looking in the direction indicated by the arrow $b$, Fig. 1. Fig. 6 is an edge view of the movement, with part of the frame removed, and looking in the direction indicated by the arrow $c$, Fig. 1. Fig. 7 is a transverse section of the watch, illustrating certain parts of the movement, the winding mechanism, and the case. Fig. 7* is a large diagram illustrating the movement as it would appear if its component parts were extended out approximately into line. Fig. 8 is a perspective view of the front plate of the movement-frame and a rim with which it is provided. Fig. 9 is a sectional view of the front plate of the movement and its rim. Fig. 10 is a rear view of the escapement-wheel and balance-wheel and their appurtenances. Fig. 10* is a view of my escapement-wheel, on an enlarged scale, more clearly illustrating the construction of the same. Fig. 11 is a sectional edge view of the escapement-wheel, and balance-wheel and their appurtenances, looking in the direction indicated by the arrow $b$, Fig. 1. Fig. 12 is a transverse section of the arbor of the balance-wheel. Fig. 13 is a side view of the arbor of the balance-wheel. Fig. 13* is a face view of one of the bearings for this arbor. Fig. 14 is a section of the spring-barrel, taken transversely to its axis. Fig. 15 is a section of the spring-barrel, taken parallel with its axis. Fig. 16 is a transverse section of a gear-wheel used in the watch. Fig. 17 is a face view of such gear-wheel, and Fig. 18 is a transverse section of the balance-wheel arbor, an end view of a collar fitted thereon, and an edge view of the hair-spring.

Similar letters of reference designate corresponding parts in all the figures.

All the views are made on an enlarged scale.

A A' designate the spring-barrel. It may be made of brass or other suitable metal, and, as shown, it consists of two parts made separately and subsequently fastened together. The part A consists of a cylinder, and the part A' consists of a disk having on its periphery teeth so that it will form a gear-wheel. The part A' has in one side a circular recess, into which is fitted one edge of the part A. The parts A A' thus fitted together may be fastened by solder. The spring-barrel is mounted loosely on a shaft or arbor, $A^2$. $A^3$ is the spring. Its inner end may be fastened to the arbor $A^2$ by engaging a hole in it with a pin or hook, $d'$, that extends from a collar, $d$, of brass or other suitable metal, which is arranged on the arbor $A^2$. The outer end of the spring is provided with a hole which is engaged with a hook, $d^2$, that is made integral with the cylinder of the barrel by making a U-shaped or analogously shaped cut in such cylinder and forcing inward the portion of metal which is within the cut. This method of forming the hook $d^2$ is advantageous because of the economy which it effects. The gear-wheel A' of the spring-barrel engages with a pinion, B, formed on or rigidly affixed to a center shaft or arbor, B'. This center shaft or arbor has affixed to it, as here shown, in front of the pinion B, a gear-wheel, $B^2$. The gear-wheel $B^2$ engages with a pinion, C, that is formed on or affixed to a shaft or arbor, C', in the same plane with this gear-wheel. The shaft or arbor C' has affixed to it a gear-wheel, $C^2$, which is arranged rearward of the pinion C.

On the center shaft or arbor, B', are loosely mounted a gear-wheel, $B^3$, and a pinion, $B^4$, which are rigidly affixed together, so as to turn in unison. The pinion $B^4$ is in the same plane as the gear-wheel $C^2$ and engages with the latter, so as to derive motion from it. The gear-wheel $B^3$, which moves in unison with the pinion $B^4$, is arranged rearward of this pinion. The gear-wheel B³ engages with a pinion, D, which is formed upon or rigidly affixed to the shaft or arbor D' of the escapement-wheel D² in the same plane with said gear-wheel. The advantages of mounting the loose gear-wheel B³ and pinion B⁴ upon the center shaft or arbor, B', are that one shaft is saved and space is economized.

E designates the balance-wheel, and E' the shaft or arbor upon which it is mounted. It is very much larger diametrically than usual. The balance-wheel arbor E' is journaled in screws $j\ j'$, which are inserted one in the cock G and one in the front plate, G', of the movement-frame. The journals of the arbor E' are taper, and the bearings in the screws $j\ j'$ which receive these journals are flaring; but preferably the flare of the bearings will be greater than the angle of the taper of the journals, so that the journals will be supported at or near the extreme tips. The bearing in the screw $j'$ is eccentric to the axis or center of the screw; hence by turning this screw the arbor of the balance-wheel may be adjusted to a nicety.

The gear-wheels B² C² B³ are preferably made of the same size, as then they can be made with more ecomomy than if made of different sizes, because fewer tools will be needed for their production. In this example of my improvement each of these wheels is designed to have sixty-four teeth. The pinions C D B⁴ are also made of the same size when the gear-wheels B² C² B³ are made of one size. In this example of my improvement each of these pinions has eight teeth. The pinion B in this example of my improvement has ten teeth, and the gear-wheel A' of the spring-barrel will preferably have seventy teeth. The escapement-wheel D² has on its periphery a series of teeth, $e$, which may be of ordinary shape, except that they will preferably be much shorter and more blunt than usual. These teeth operate in conjunction with a notch or recess, $f$, entending lengthwise of the arbor E' of the balance-wheel. The escapement-wheel D² also has a series of teeth, $e'$, which are similar in shape to the teeth $e$, but extend from the side of the wheel. These teeth $e'$ are formed by making V-shaped or analogously-shaped cuts through the side of the wheel and forcing out the portions which are within the cuts. They extend from the side of the escapement-wheel which is the nearer to the balance-wheel—in this example of my improvement from the rear side of the escapement-wheel. They are arranged in positions intermediate to the positions of the teeth $e$. There are in this example of my improvement sixteen of each series of teeth upon the escapement-wheel. The teeth $e'$ of the escapement-wheel are for giving the impulses to the balance-wheel. They operate in conjunction with a pin or lug, $g$, projecting from one of the spokes of the balance-wheel. This pin $g$ is driven through the spoke from which it extends and is riveted in the same. Preferably the side on which the teeth $e'$ of the escapement-wheel operate will be made flat, as the teeth $e'$ can operate on it more effectively when made flat than if made round. The escapement-wheel in watches is the most delicate and expensive part of the watch, and can be made only by the most skillful workmen.

My escapement-wheel is easily and cheaply made, because I can take a number of blanks or disks of thin metal of the size of escapement-wheels to be produced, put them together, as is now done with clock-wheel blanks, and then put them into a gear-cutting machine and cut the teeth on the periphery. The teeth are so short and of such shape that the escapement-wheels can be cut as easily as ordinary gear-wheels.

The teeth that are made on the face or side of my escapement-wheel may be made in a die at one blow, and the wheel will then be finished, excepting a slight polishing on a buff.

In Fig. 10* I have shown in dotted lines, as at $e^3$, the surfaces of the outer or peripherical set of teeth, $e$, extending inwardly to a point of intersection with a circular line drawn coincidently with the rearmost portion of the inner set of teeth, $e'$. It will be seen by this that were the surfaces of the outer or peripherical teeth so extended each of these teeth at its base would extend almost to the next adjoining tooth, and the inner teeth could not be arranged in the same manner and position as I have shown them to be in my escapement-wheel. This demonstrates that the teeth $e$ could not be made as blunt as they are now if they were extended to a circular line coincident with the bases of the inner set of teeth, $e'$. It is desirable that all the teeth should be blunt, because then they will be stiff and strong in the direction in which they are subjected to strain, even when the wheel is made of very thin metal. If not sufficiently stiff in the direction in which they are subjected to strain, they would be liable to spring, so as to fail in the fulfillment of their functions. By my method of making the wheel I can place the inner set of teeth, $e'$, at any desired distance nearer the center of the wheel. The hair-spring F is fastened at the inner end to a collar on the arbor of the balance-wheel and at the outer end to an arm, $h$, extending from the plate or cock G, forming part of the movement-frame. The outer end of the arm $h$ is bent forward into the plane of the hair-spring, and the outer end of the hair-spring is inserted into a hole in it and secured there by a pin wedged in. The inner end of the hair-spring is slipped edgewise into a notch in the rear end of a collar, $i$, which is mounted on the arbor of the balance-wheel, as shown particularly in Fig. 18. This collar $i$ is split and forced on the said arbor, so that it will be maintained there by friction. When the inner end of the hair-spring is inserted in its notch in the collar $i$ the edges of the notch are closed over it by a blow or otherwise. From time to time as the escapement-wheel rotates one of its teeth $e$ comes in contact with the arbor E' of the balance-wheel E, and thereupon the escapement-wheel is arrested. This happens while the adjacent portions of escapement-wheel and of the arbor E' are moving in the same direction, as indicated by the arrows in Fig. 10. When the balance-wheel changes the direction of its rotation, the recess $f$ is carried past the tooth of the escapement-wheel which is in contact with the arbor E'. As soon as the balance-wheel changes the direction of its rotation again and rotates in the same direction as when the tooth was arrested, the recess $f$ is brought opposite the tooth, the tooth enters it, the tooth and arbor move together until the tooth passes the arbor, and at about this time one of the teeth $e'$ comes in contact with the pin or lug $g$ of the escapement-wheel and gives an impulse to it. The regulator-lever H comprises a split ring, $k$, which fits on a circular hub, $l$, struck up on the cock G. The said hub may be undercut. The end of the lever which projects beyond the cock is bent forward and then backward, so as to form a loop for the reception of the hair. The front plate, G', of the movement-frame has on its rear side a rim, $G^2$, shaped like the segment of a circle. This rim will preferably be cast with the plate, and forms a recess for the movement on the rear side of the plate G'. On the front side of said plate I have shown recesses cast therein in which the dial and hand-work may be arranged. Instead of a rim a number of projections could be cast with the plate. The back plate, $G^3$, of the frame and the cock G are secured to the rim $G^2$ by screws $m$. Preferably the front and back plates of the frame will be made of an anti-friction metal—such, for instance, as Babbitt metal. Bushings may be inserted in the plates, if desirable, for the reception of the journals of the shafts or arbors.

I will now describe what is commonly known as the "dial-work," premising that recesses for its accommodation may be cast in the plate G'. On the center shaft or arbor, B', at the forward side of the front plate, G, of the movement-frame, a pinion, $B^5$, is arranged. It is formed on or affixed to a hollow or cannon shaft, $B^6$, which fits the arbor or shaft B' so tightly on the arbor B' as to turn therewith by friction. With this pinion $B^5$ engages a gear-wheel, H', which turns on a non-rotary stud, $n$, extending from the front plate of the movement-frame. The gear-wheel H' has affixed to its forward side a pinion, $H^2$, which engages with a gear-wheel, I. This gear-wheel I is affixed to a hollow or cannon shaft, I', which fits loosely upon the cannon-shaft $B^6$. The pinion $B^5$ and cannon-shaft $B^6$ turn once an hour, and the gear-wheel I and cannon-shaft I' turn once in twelve hours. The minute-hand is arranged upon the shaft $B^6$, and the hour-hand is mounted on the shaft I'. As the shaft $B^6$ is only held on the shaft B' by friction, it may be turned to set the hands without affecting the shaft B'.

J is a gear-wheel which is mounted on a stud or screw, $o$, affixed to the front plate of the movement-frame, and engages with the gear-wheel H'. There are in the forward side of the front plate of the movement-frame recesses which receive the pinions and wheels $B^5$ H' $H^2$ I. Over the forward side of the front plate of the movement-frame is secured by screws or other means a plate, K, whereby the gear-wheels H' I and pinion $H^2$ are secured in place. The dial is arranged on this plate. It may consist of a printed piece of paper. The hands extend outside the dial. The gear-wheel J is of peculiar construction. It has teeth which extend from its periphery and also beyond one side; hence it is a combined peripherical gear-wheel and crown-wheel. I prefer to make this wheel by taking a thick disk of metal, forming teeth on its periphery in the usual way, and then routing or cutting out from one side a circular portion just inward of the inner line or base-line of the teeth.

L designates a bevel gear-wheel, which is mounted on a stud or screw, $q$, inserted in the back plate of the movement-frame. The periphery of this wheel L does not extend quite as far outward as the inner periphery or base-line of the teeth of the wheel J.

M designates a bevel gear-wheel, affixed to the inner end of a rod, M'. This rod extends through the stem N of the case O, and at the outer end it has secured to it a cap, $M^2$, which extends over the outer end of the stem. In the stem, near the outer end, is fitted a tube, $M^3$, which fits snugly between the stem and the rod, and is fastened in place by a pin, $r$, extending transversely through the stem into it.

Between the inner end of the tube $M^3$ and the bevel gear-wheel M a spiral spring, $M^4$, surrounds the rod M'. This spring serves to force the rod M' and bevel gear-wheel M inwardly, so that the latter will normally engage with the bevel gear-wheel L and not with the gear-wheel J. The gear-wheel L engages with a gear-wheel, P, that is affixed to the arbor or shaft $A^2$ of the spring-barrel A A'. A pawl, $s$, engaging with the gear-wheel P, precludes it from being turned in the wrong direction. By turning the cap $M^2$ when the gear-wheels M and L are in engagement the watch may be wound. By pulling the cap $M^2$ outwardly the gear-wheel M will be pulled out of engagement with the gear-wheel L and into engagement with the gear-wheel J. The hands may then be set.

The manner in which the gear-wheel M is secured to the rod M' is somewhat important. This rod at the inner end is shouldered, and beyond the shoulder is screw-threaded. The wheel is put in its place in the movement-frame, and with the latter introduced into the case. The rod is then introduced into the stem and screwed into the wheel.

I have not described the construction of the case of the watch, because I intend to make it the subject of another application for Letters Patent.

What I claim as my invention, and desire to secure by Letters Patent, is—

1. In a time-piece, the combination of a rotary shaft or arbor, B', actuated from the motive agent of the time-piece, the gear-wheel B², affixed to the shaft or arbor B', so as to derive motion from it, the shaft or arbor C', the pinion C, affixed to the shaft or arbor C' and deriving motion from the gear-wheel B², the gear-wheel C², affixed to the shaft or arbor C', the pinion B⁴, deriving motion from the gear-wheel C², the gear-wheel B³, rigidly connected to the pinion B⁴ and with it loosely mounted on the shaft or arbor B', the escapement-wheel shaft or arbor D', and the pinion D, affixed to the latter and deriving motion from the gear-wheel B³, substantially as specified.

2. In a time-piece, the combination of the rotary shaft or arbor B', actuated from the motive agent of the time-piece, the gear-wheel B², affixed to the shaft or arbor B', so as to derive motion from it, the shaft or arbor C', the pinion C, affixed to the shaft or arbor C' and deriving motion from the gear-wheel B², the gear-wheel C², affixed to the shaft or arbor C', the pinion B⁴, deriving motion from the gear-wheel C², the gear-wheel B³, rigidly connected to the pinion B⁴ and with it loosely mounted on the shaft or arbor B', the escapement-wheel shaft or arbor D', affixed to the latter and deriving motion from the gear-wheel B³, the gear-wheels B², C², and B³ being made alike, substantially as specified.

3. As a new article of manufacture, a time-piece escapement-wheel having a circular peripheral portion, one set of teeth extending beyond said peripheral portion, and a second set of teeth extending from the side inward of the peripheral portion, formed by making V-shaped or analogous shaped cuts in it and bending out the portions of metal which are within these cuts, substantially as specified.

4. In a time-piece, the combination, with a balance-wheel, of a screw constituting a bearing for one of the journals of its arbor, capable of a rotary adjustment, and having the recess for the journal arranged eccentrically to the axis about which the said bearing is adjustable, substantially as specified.

5. In a time-piece movement, the combination, with a gear-wheel for winding a spring and a gear-wheel for setting the hands, arranged upon the opposite side of the movement, and having its teeth out of line with the teeth of the gear-wheel for winding the spring, of an intermediate gear-wheel, a rod carrying the latter at the inner end and fitted in a stem, so that it can be moved longitudinally to shift the gear-wheel which it carries into direct engagement either with the gear-wheel for winding the spring or the gear-wheel for setting the hands, substantially as specified.

6. In a time-piece movement, the combination, with a gear-wheel for winding a spring and a gear-wheel for setting the hands, arranged upon the opposite side of the movement and having its teeth out of line with the teeth of the gear-wheel for winding the spring, of an intermediate gear-wheel, a rod carrying the latter at its inner end and fitted with a stem, so as to be capable of being longitudinally moved to engage directly with either of the other of said gear-wheels, and a spring for keeping the intermediate wheel normally in engagement with the wheel for winding the spring, substantially as specified.

7. In a time-piece, the combination, with dial-work and a rod fitted in a stem and carrying a gear-wheel at its inner end, of a wheel having peripherical teeth engaging with one of the wheels of the dial-work, and side or crown wheel teeth engaging with the wheel which is carried by the said rod, substantially as specified.

8. In a time-piece, the combination, with a case having a stem, of a winding and a setting mechanism arranged upon opposite sides of a watch-movement, a gear-wheel adapted to act in conjunction with either, and a rod arranged in the stem and having the said gear-wheel secured to it by screw-threads, substantially as and for the purpose specified.

HIRAM W. HAYDEN.

Witnesses:
T. J. KEANE,
E. T. ROCHE.